United States Patent
Cho et al.

(10) Patent No.: US 9,811,156 B2
(45) Date of Patent: Nov. 7, 2017

(54) PORTABLE DEVICE INCLUDING INDEX DISPLAY REGION AND METHOD FOR CONTROLLING THE SAME

(71) Applicant: LG ELECTRONICS INC., Seoul (KR)

(72) Inventors: Eunhyung Cho, Seoul (KR); Sinae Chun, Seoul (KR); Jihwan Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 97 days.

(21) Appl. No.: 13/906,025

(22) Filed: May 30, 2013

(65) Prior Publication Data

US 2014/0313119 A1 Oct. 23, 2014

(30) Foreign Application Priority Data

Apr. 23, 2013 (KR) ........................ 10-2013-0044719

(51) Int. Cl.
*G06F 3/01* (2006.01)
*G06F 3/0483* (2013.01)
*G06F 3/0488* (2013.01)

(52) U.S. Cl.
CPC ............ *G06F 3/013* (2013.01); *G06F 3/0483* (2013.01); *G06F 3/04883* (2013.01)

(58) Field of Classification Search
CPC .. G09G 5/37; G06F 3/01; G06F 3/041; G06F 3/013; G06F 3/0483; G06F 3/04883; H05K 7/00
See application file for complete search history.

(56) References Cited

U.S. PATENT DOCUMENTS

| | | | |
|---|---|---|---|
| 2003/0119562 A1* | 6/2003 | Kokubo | ........................ 455/566 |
| 2007/0236475 A1* | 10/2007 | Wherry | ........................ 345/173 |
| 2010/0117975 A1* | 5/2010 | Cho | ...................... G06F 1/1626 345/173 |
| 2011/0252369 A1* | 10/2011 | Chaudhri | ............ G06F 3/04883 715/830 |

(Continued)

FOREIGN PATENT DOCUMENTS

EP 1635550 A1 3/2006
KR 10-2006-0032881 A 4/2006

*Primary Examiner* — Amr Awad
*Assistant Examiner* — Wing Chow
(74) *Attorney, Agent, or Firm* — Birch, Stewart, Kolasch & Birch, LLP

(57) ABSTRACT

A portable device including an index display region and a method for controlling the same are disclosed. A method for controlling a portable device includes displaying a first layer from among a plurality of layers on a first display region located at a front surface of the portable device; displaying an index of the plurality of layers on a second display region located at a lateral surface of the portable device; determining a user-viewed display region from among the first display region and the second display region; detecting a first control input to the first display region; and controlling the first layer displayed on the first display region in response to the first control input when a user gazes at the first display region, or controlling the index displayed on the second display region in response to the first control input when the user gazes at the second display region.

16 Claims, 8 Drawing Sheets

(56) References Cited

U.S. PATENT DOCUMENTS

| | | |
|---|---|---|
| 2011/0298826 A1 | 12/2011 | Namba |
| 2012/0242692 A1* | 9/2012 | Laubach ............... 345/629 |
| 2012/0254646 A1 | 10/2012 | Lin |
| 2012/0272179 A1 | 10/2012 | Stafford |
| 2012/0290972 A1 | 11/2012 | Yook et al. |
| 2013/0076649 A1* | 3/2013 | Myers et al. ............ 345/173 |
| 2014/0009914 A1* | 1/2014 | Cho et al. ............... 362/97.3 |
| 2014/0068475 A1* | 3/2014 | Li ................. G06F 17/30861 715/765 |

* cited by examiner

FIG. 1
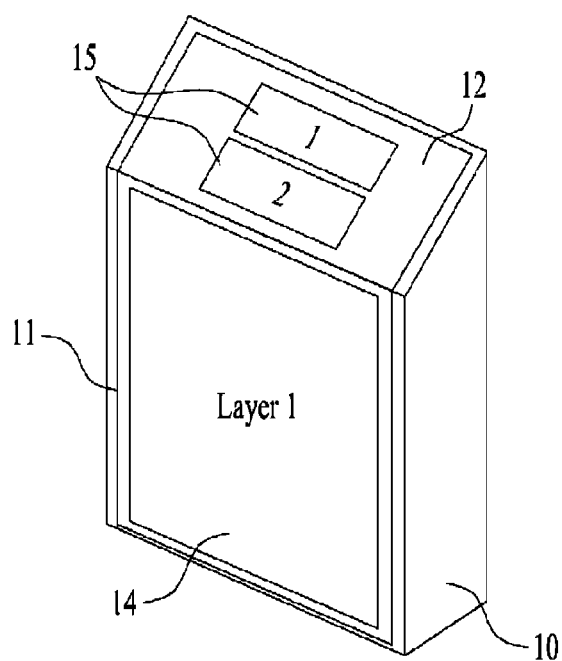
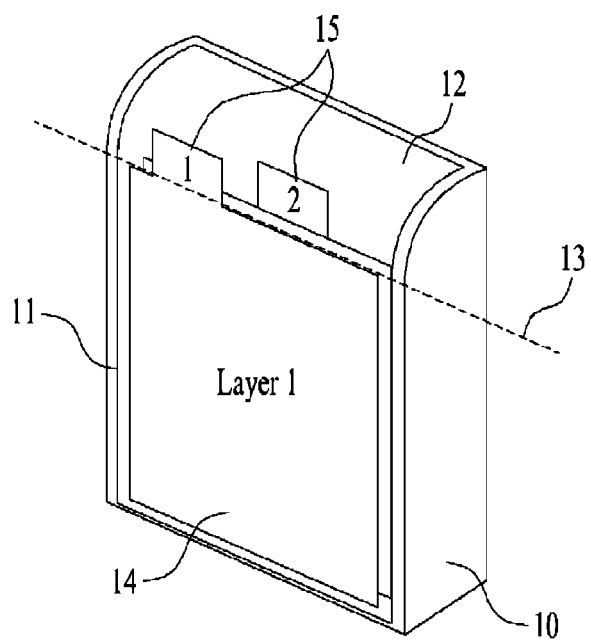

FIG. 3
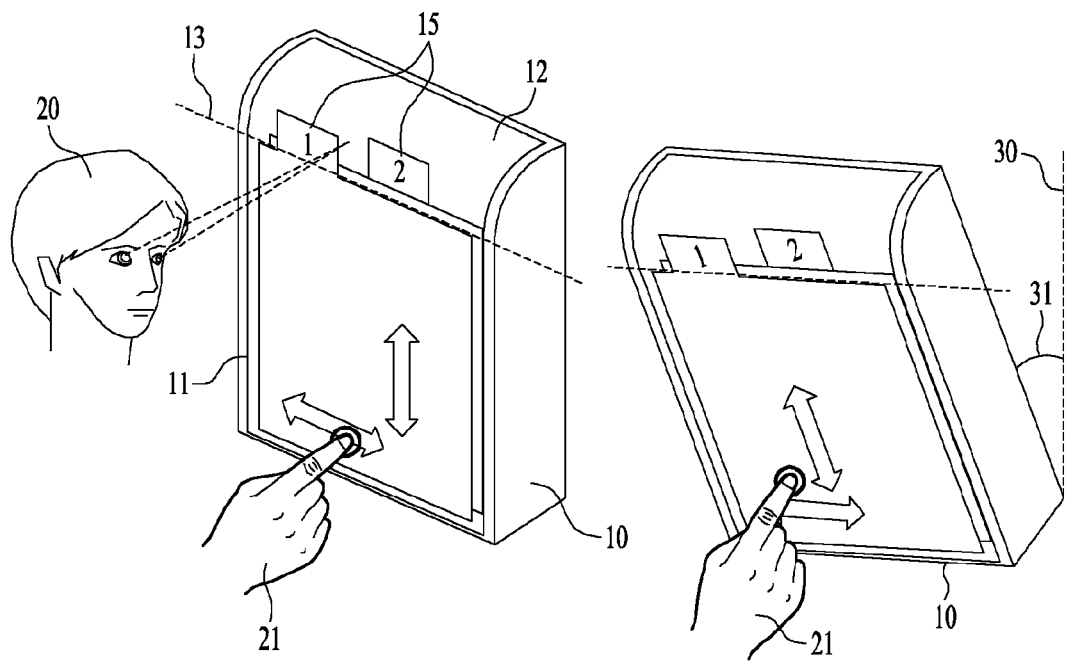
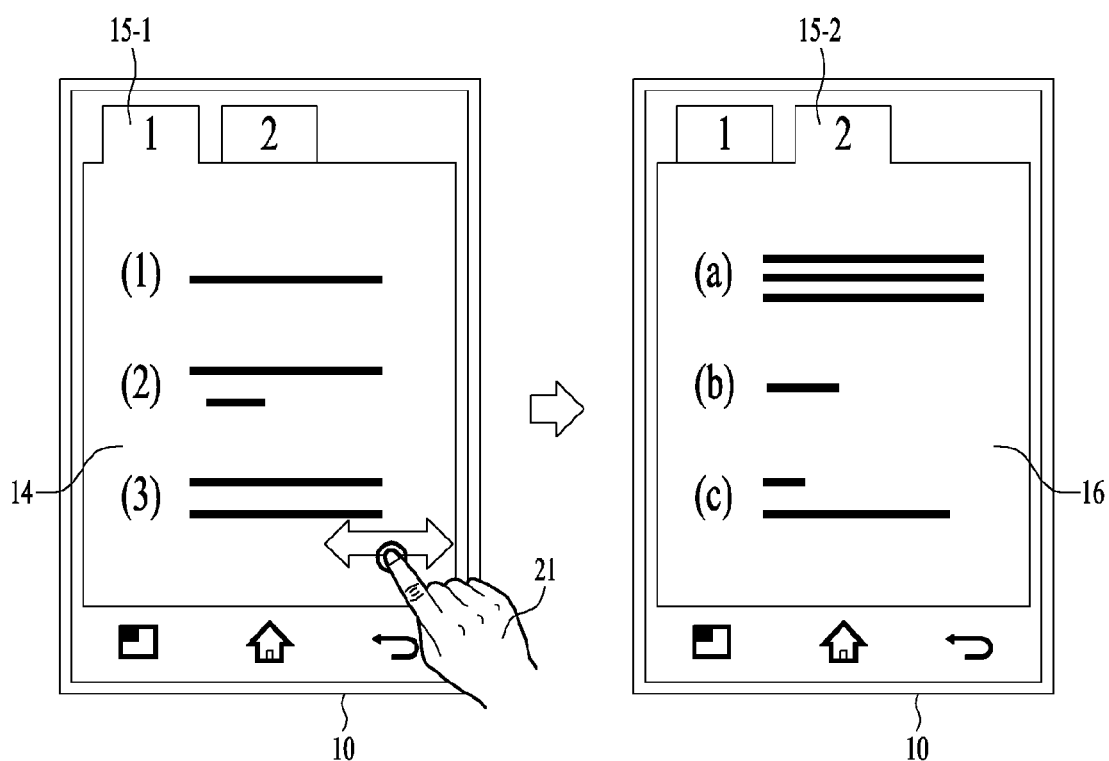

PORTABLE DEVICE INCLUDING INDEX DISPLAY REGION AND METHOD FOR CONTROLLING THE SAME

This application claims the benefit of Korean Patent Application No. 10-2013-0044719, filed on Apr. 23, 2013, which is hereby incorporated by reference as if fully set forth herein.

BACKGROUND OF THE INVENTION

Field of the Invention

Embodiments relate to a portable device, and more particularly to a portable device including a separate display region for displaying an index of a displayed layer.

Discussion of the Related Art

With the development of portable devices, multi-tasking capable of simultaneously executing a plurality of applications using a single portable device has become possible. A portable device may display a user-selected application from among a plurality of currently-running applications.

The portable device may arrange a plurality of currently running applications for deciding a plurality of applications to be displayed on a display region, and may receive user input. That is, the portable device may display a screen image for selecting one of a plurality of applications currently running in the background, instead of displaying an execution screen image of a currently displayed application. As a result, the portable device cannot provide a user with an execution screen image of a currently displayed application needed for switching the application any longer.

SUMMARY OF THE INVENTION

Accordingly, the present specification is directed to a portable device including an index display region and a method for controlling the same that substantially obviate one or more problems due to limitations and disadvantages of the related art.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

To achieve these objects and other advantages and in accordance with the purpose of the specification, as embodied and broadly described herein, a portable device includes a display unit configured to detect a control input, and display digital information, wherein the display unit includes a first display region located at a front surface of the portable device and a second display region located at a top or lateral surface of the portable device; a sensor unit configured to sense which one of the first display region and the second display region is viewed by a user; and a controller configured to control the display unit and the sensor unit, wherein the controller displays a first layer from among a plurality of layers on the first display region, displays an index of the plurality of layers on the second display region, determines a user-viewed display region from among the first display region and the second display region, detects a first control input to the first display region, and controls a first layer displayed on the first display region in response to the first control input when the user gazes at the first display region, or the index displayed on the second display region in response to the first control input when the user gazes at the second display region.

In accordance with another aspect of the present specification, a method for controlling a portable device includes: displaying a first layer from among a plurality of layers on a first display region located at a front surface of the portable device; displaying an index of the plurality of layers on a second display region located at a lateral surface of the portable device; determining a user-viewed display region from among the first display region and the second display region; detecting a first control input to the first display region; and controlling a first layer displayed on the first display region in response to the first control input when a user gazes at the first display region or the index displayed on the second display region in response to the first control input when the user gazes at the second display region.

It is to be understood that both the foregoing general description and the following detailed description of the present specification are exemplary and explanatory and are intended to provide further explanation of the specification as claimed.

BRIEF DESCRIPTION OF THE DRAWINGS

The accompanying drawings, which are included to provide a further understanding of the specification and are incorporated in and constitute a part of this application, illustrate embodiment(s) of the specification and together with the description serve to explain the principle of the specification.

FIG. 1 illustrates a portable device according to an embodiment.

FIG. 3 illustrates a portable device operated in response to the user's eyes according to an embodiment.

DETAILED DESCRIPTION OF THE INVENTION

Figure 2:
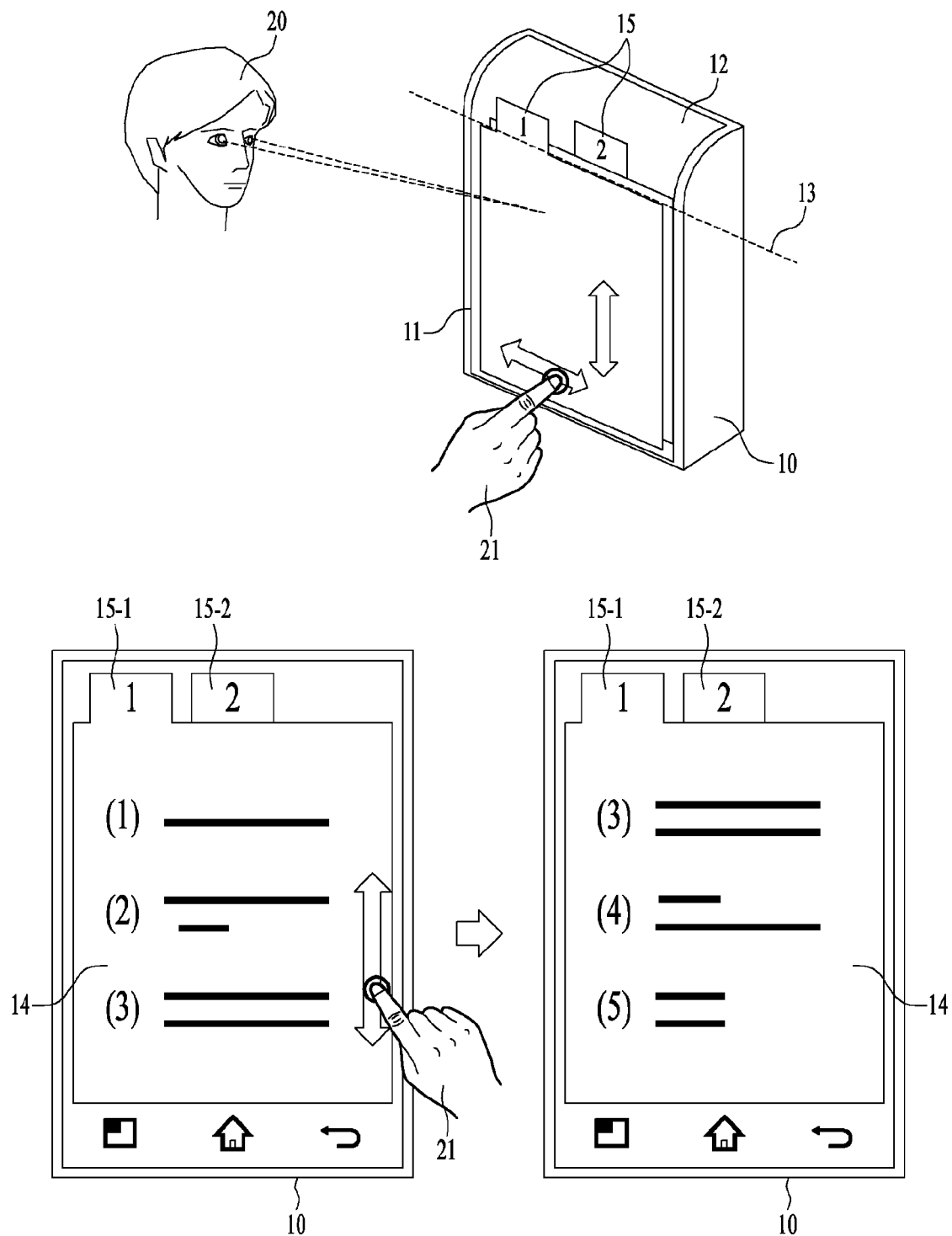
FIG. 2 illustrates a portable device operated in response to the user's eyes according to an embodiment.

Reference will now be made in detail to the embodiments, examples of which are illustrated in the accompanying drawings. The detailed description, which will be given below with reference to the accompanying drawings, is intended to explain exemplary embodiments of the present specification, rather than to show the only embodiments that can be implemented according to the present specification.

Although most terms of elements in this specification have been selected from general ones widely used in the art taking into consideration functions thereof in this specification, the terms may be changed depending on the intention or convention of those skilled in the art or the introduction of new technology. Some terms have been arbitrarily selected by the applicant and their meanings are explained in the following description as needed. Thus, the terms used in this specification should be construed based on the overall content of this specification together with the actual meanings of the terms rather than their simple names or meanings.

The portable device may include at least one of a smartphone, a smart pad, a music player, a tablet computer, and a laptop computer. In the embodiment, the portable device may include a main display region and an index display region. The main display region may be referred to as a first display region, and the index display region may be referred to as a second display region.

FIG. 1 illustrates a portable device according to an embodiment. Referring to FIG. 1, a first display region 11 may be located at the front surface of the portable device 10, and a second display region 12 may be located at a lateral or top surface of the portable device 10. In this case, the first display region 11 may include a larger display region than the second display region 12.

The portable device 10 may include a first display region 11 and a second display region 12 that are discriminated by at least one edge of the portable device as shown in the upper part of FIG. 1. An internal angle (a) between the first display region 11 and the second display region 12 may be 90°≤α≤180°. The second display region 12 may be located at the top or lateral surface of the portable device.

In another embodiment, the portable device may include a first display region 11 and a curved-type second display region 12 connected to the first display region 11 as shown in the lower part of FIG. 1. The second display region 12 is connected to the first display region 12 so that it may be located at the top or lateral surface of the portable device. The portable device 10 may establish a region boundary line 13 between the first display region 12 and the second display region 12.

The portable device 10 may carry out a plurality of applications, and individual applications may correspond to different layers, respectively. In this case, each layer represents an execution region or execution screen image of each application, and may include content in the execution region. While the following description discloses the layer as an example, it should be noted that the layer may indicate content. In accordance with the embodiment, one application may correspond to a plurality of layers. For example, the portable device 10 may display a first layer 14 corresponding to a first application on the first display region 11. The portable device 10 may display an index 15 indicating a plurality of applications on the second display region 12. The index 15 displayed on the second display region 12 may include an entry corresponding to each layer. Here, the entry may indicate the content. That is, the portable device may include a title, a summary, or a tag of each layer serving as the entry in the index. For example, a first entry corresponding to the first layer 14 may indicate the title of the first layer, and a second entry corresponding to the second layer 16 may indicate a tag of the second layer. The portable device 10 may display an index 15 including the first entry and the second entry on the second display region 12.

A user may select the first entry or the second entry of the index 15 displayed on the second display region 12, such that a desired application may be displayed on the first display region 11. The portable device 10 may display a layer corresponding to the user-selected entry on the first display region 11. For example, if a control input signal for the second entry is detected when the portable device 10 displays the first layer 14 on the first display region 11, the portable device may display a second layer corresponding to the second entry on the first display region 11. The portable device may convert the first layer 14 displayed on the first display region 11 into the second layer 16 such that it may display the second layer 16.

FIG. 2 illustrates a portable device operated in response to the user's eyes according to an embodiment. As can be seen from the upper part of FIG. 2, the portable device may determine which one of the first display region 11 and the second display region 12 is viewed by the user. The portable device 10 may determine which one of display regions is viewed by the user using at least one of a user's grip, the direction of gravity, a user's face, a user gaze direction, and a variation of illumination. In addition, the portable device may detect user control input 21. The portable device may detect at least one of touch input, voice input, remote-controller input, and gesture input as the control input 21.

If the user gazes at the first display region 11, the portable device 10 may control the first display region 11 in response to the control input 21. As can be seen from the lower part of FIG. 2, the portable device may control the content of the first layer 14 displayed on the first display region 11 in response to the control input 21. The portable device may scroll the content of the first layer 14 in response to the control input 21. For example, when the user gazes at the first display region 11 and then inputs a touch input for up/down scrolling to the first display region through the control input 21, the portable device may vertically scroll the content of the first layer 14 displayed in response to the touch input.

If the user gazes at the first display region, the portable device may maintain the entry of the index displayed on the second display region 12 without change. That is, the portable device 10 may maintain a first entry 15-1 corresponding to the first layer 14 with respect to the index including a plurality of entries 15-1 and 15-2 as shown in FIG. 2.

While the above-mentioned description has exemplarily disclosed the operation for scrolling the content of the first layer, it should be noted that the operation for controlling the content by the portable device of this embodiment may include extension, reduction, movement, copying, and cutting of the content.

As described above, the portable device may control the content of the first display region viewed by the user in response to the control input, and may maintain the content of the second display region not viewed by the user without change.

FIG. 3 illustrates a portable device operated in response to the user's eyes according to an embodiment. The portable device may determine which one of the first display region 11 and the second display region 12 is viewed by the user 20 as shown in the upper part of FIG. 3. The portable device 10 may determine which display region is viewed by the user using at least one of a user's grip, the direction of gravity, a user's face, a user gaze direction, and variation of illumination.

As can be seen from the left upper end of FIG. 3, the portable device may detect that the user gazes at the second display region 12 using at least one of a camera, a pupil tracking sensor, and an image sensor. As can be seen from the right upper end of FIG. 3, the portable device may detect a tilt angle 31 titled on the basis of the direction of gravity 30. When the portable device senses the tilt angle 31, it may use at least one of a gravity sensor, a tilt sensor, and a gyro sensor. If the tilt angle 31 is higher than a first angle, the portable device may determine that the user gazes at the second display region 12. The first angle may be pre-established by a user or a manufacturer of the portable device.

In addition, the portable device may detect user control input 21. The portable device may detect at least one of touch input, voice input, remote-controller input, and gesture input as the control input 21.

If the user gazes at the second display region 12, the portable device 10 may control the second display region 12 in response to the control input 21. The portable device may control the content displayed on the second display region 12 in response to the control input applied to the first display region 11, because the portable device determines that the user gazes at the second display region 12. That is, the portable device may determine the user-viewed display region as a control target.

As can be seen from the lower end of FIG. 3, the portable device may control the index displayed on the second display region 12 in response to the control input 21. The index may include the entry corresponding to a layer displayed on the first display region. The portable device may change the entry contained in the index in response to the control input 21. For example, if the user gazes at the second display region and inputs a touch input for left/right scrolling as the control input 21 to the first display region, the portable device may control the index in response to the touch input. The portable device may change a first entry contained in the index to a second entry in response to the control input 21.

As can be seen from the left lower end of FIG. 3, the portable device 10 may display the content of the first layer 14 on the first display region 11 corresponding to the first entry 15-1. The portable device may change the first entry to the second entry in response to the user control input 21 applied to the first display region. As can be seen from the right lower end of FIG. 3, the portable device 10 may display the content of the second layer 16 corresponding to the second entry 15-2 on the first display region 11.

As described above, if it is determined that the user gazes at the second display region when the control input is applied to the first display region, the portable device may control the content displayed on the second display region. As a result, the user may control the second display region using not only the control input of the first display region but also the user's eyes without touching the second display region.

Figure 4:
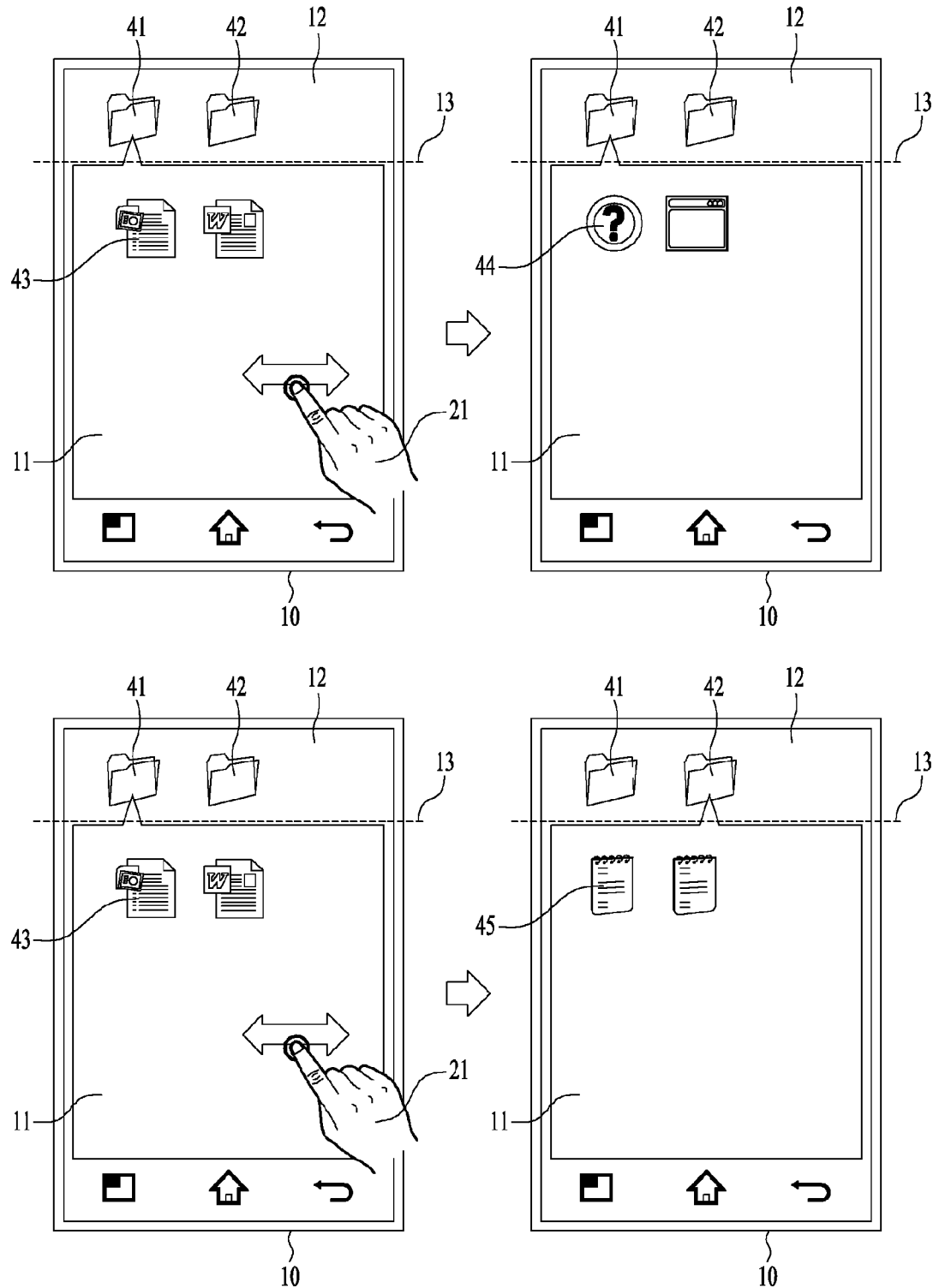
FIG. 4 is a conceptual diagram illustrating a method for controlling an index including a folder according to an embodiment.

FIG. 4 is a conceptual diagram illustrating a method for controlling an index including a folder according to an embodiment. The portable device may determine which display region is viewed by the user. If the control input is detected, the portable device may control the display region viewed by the user in response to the detected control input.

The upper end of FIG. 4 shows a method for operating the portable device configured to determine that the user gazes at the first display region 11. The portable device may include a first display region 11 and a second display region 12. In this case, the first display region and the second display region may be distinguished from each other by the region boundary line 13. The portable device may display an icon of each folder on the second display region. The portable device may display icons of files contained in each folder on the first display region. That is, the portable device may display the content on the first display region, and may display a high-order content of the content displayed on the first display region.

As can be seen from the left upper end of FIG. 4, the portable device 10 may display a first folder 41 and a second folder 42 on the second display region. The portable device may display a file 43 contained in the first folder 41 on the first display region when the user selects the first folder 41. If the user control input 21 is detected from the first display region, the portable device may determine which display region is viewed by the user. If the user gazes at the first display region, the portable device may display the other file 44 contained in the first folder 41 on the first display region 11 in response to the control input 21 as shown in the right upper end of FIG. 4. That is, the portable device may scroll the content contained in the first folder 41 in response to the control input 21, and display the scroll result. Although the above-mentioned description has exemplarily disclosed the operation for scrolling the content of the first folder, it should be noted that the operation for controlling the content by the portable device of this embodiment may include extension, reduction, movement, copying, and cutting of the content.

The lower end of FIG. 4 shows a method for operating the portable device configured to determine that the user gazes at the second display region 12. As can be seen from the left lower end of FIG. 4, the portable device 10 may display the first folder 41 and the second folder 42 on the second display region. If the user selects the first folder 41, the portable device may display the file 43 contained in the first folder 41 on the first display region. If the user control input 21 is detected from the first display region, the portable device may determine which display region is viewed by the user. If the user gazes at the second display region, the portable device may release the first folder 41 selected by the user, and may select the second folder 42 in response to the control input 21 as shown in the right lower end of FIG. 4. In addition, the portable device may display the file 45 contained in the second folder 42 on the first display region 11. That is, the portable device may control the content displayed on the second display region 12 in response to the control input 11 detected from the first display region 11.

As described above, the portable device may control the displayed content on the basis of not only specific information indicating which display region is viewed by the user but also the detected control input. As a result, the user may control each of the first display region and the second display region using not only the control input of the first display region but also the user's eyes regarding the first display region.

Figure 5:
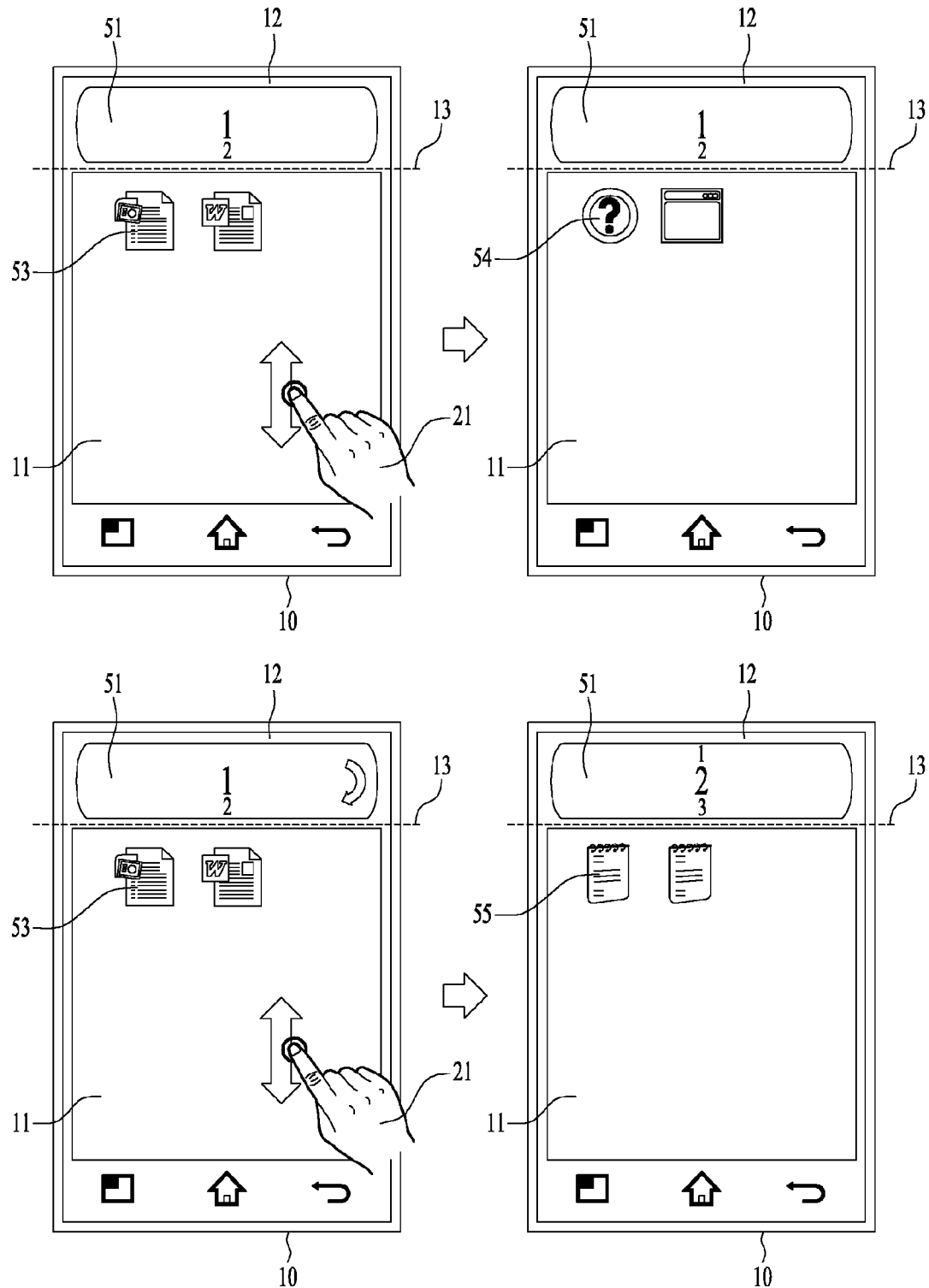
FIG. 5 is a conceptual diagram illustrating a method for controlling a scroll wheel interface according to an embodiment.

FIG. 5 is a conceptual diagram illustrating a method for controlling a scroll wheel interface according to an embodiment. The portable device may include a first display region 11 and a second display region 12. In this case, the first display region and the second display region may be distinguished from each other by the region boundary line 13. The portable device may determine which display region is viewed by the user. If the control input is detected, the portable device may control the display region viewed by the user in response to the detected control input.

The upper end of FIG. 5 shows a method for operating the portable device configured to determine that the user gazes at the first display region 11. The portable device may include a first display region 11 and a second display region 12. In this case, the first display region and the second display region may be distinguished from each other by the region boundary line 13. The portable device may display the scroll wheel interface 51 on the second display region 12. The scroll wheel interface 51 may include at least one entry, and each entry may correspond to the content. If the entry of the scroll wheel interface is selected, the portable device may display the content corresponding to the entry on the first display region 11. In other words, the portable device may display the content on the first display region, and may display the entry corresponding to a high-order content of the content displayed on the first display region on the second display region so that the entry may be displayed as the scroll wheel interface 51 on the second display region.

As can be seen from the left upper end of FIG. 5, the portable device 10 may display the scroll wheel interface 51 on the second display region. The portable device may display the first entry and the second entry on the scroll wheel interface 51. The portable device may display a larger-sized entry selected from among the plurality of entries of the scroll wheel interface as compared to the non-selected entry. As can be seen from the upper end of FIG. 5, the first entry is a selected entry, and the second entry is a non-selected entry.

The portable device may display the content 53 corresponding to the selected first entry on the first display region. If the user control input 21 is detected from the first display region, the portable device may determine which display region is viewed by the user. If the user gazes at the first display region, the portable device may display the other content 54 corresponding to the first entry on the first display region 11 in response to the control input 21. That is, the portable device may scroll the content corresponding to the first entry in response to the control input 21, and may display the scrolled result. While the above-mentioned description has exemplarily disclosed the operation for scrolling the content, it should be noted that the operation for controlling the content by the portable device of this embodiment may include extension, reduction, movement, copying, and cutting of the content.

The lower end of FIG. 5 shows a method for operating the portable device configured to determine that the user gazes at the second display region 12. As can be seen from the left lower end of FIG. 5, the portable device 10 may display the scroll wheel interface 51 on the second display region. If the user selects the first entry, the portable device may display the content 53 corresponding to the first entry on the first display region. If the user control input 21 is detected from the first display region, the portable device may determine which display region is viewed by the user. If the user gazes at the second display region, the portable device may rotate the scroll wheel interface 51 in response to the control input 21.

As can be seen from the right lower end of FIG. 5, the portable device may rotate the wheel interface in response to the control input 21, and may select the second entry instead of the first entry selected by the user. In addition, the portable device may display the content 55 corresponding to the second entry on the first display region 11. That is, the portable device may control the scroll wheel interface displayed on the second display region 12 in response to the control input 11 detected from the first display region 11.

When the portable device controls the first or second display region in response to the control input applied to the first display region, the portable device may establish different control sensitivities. For example, when the portable device controls the content of the first display region in response to the control input, the portable device may scroll the content by a second distance in response to a first distance caused by movement of the control input. In addition, when the portable device controls the scroll wheel interface of the second display region in response to the control input, the portable device may rotate the scroll wheel interface by a third distance in response to the first distance caused by movement of control input. As described above, the portable device may assign different control sensitivities to respective control targets in response to the same control input, such that it can provide more precise control operations to the user.

As described above, the portable device may control a displayed interface and content on the basis of not only specific information indicating which display region is viewed by the user but also the detected control input. As a result, the user may control each of the first display region and the second display region using not only the control input of the first display region but also the user's eyes regarding the first display region.

Figure 6:
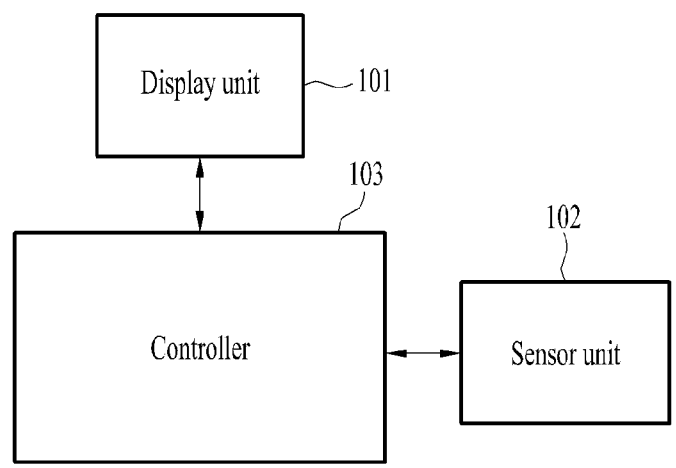
FIG. 6 is a block diagram illustrating a portable device according to an embodiment.

FIG. 6 is a block diagram illustrating a portable device according to an embodiment. Referring to FIG. 6, the portable device may include a display unit 101, a sensor unit 102, and a controller 103.

The display unit 101 may display content. The display unit may include a first display region and a second display region. The display unit may include not only a first display region located at the front surface of the portable device, but also a second display region locate at a lateral or top surface of the portable device. The first display region and the second display region of the display unit may be distinguished from each other by the region boundary line. The second display region of the display unit may have a curved surface. The display unit may display content in the first display region, and may display a high-order content of the content of the first display region on the second display region. For example, assuming that the display unit 101 displays a plurality of files on the first display region, a folder including such files may be displayed on the second display region. In addition, assuming that the display unit 101 displays an electronic book (E-book) on the first display region, the list of the electronic book may be displayed on the second display region. Alternatively, assuming that the display unit 101 displays music content on the first display region, a music album including music content may be displayed on the second display region. In addition, assuming that the display unit 101 displays the content of a web browser on the first display region, a window tab of the web browser may be displayed on the second display region.

The display unit 101 may include at least one of an Organic Light Emitting Diode (OLED), a Liquid Crystal Display (LCD), an electronic ink display, and a flexible display.

The sensor unit 102 may determine which display region contained in the display unit is viewed by the user. The sensor unit 102 may determine which display region is viewed by the user using at least one of a user's grip, the direction of gravity, a user's face, a user gaze direction, and a variation of illumination. For example, the sensor unit 102 tracks the pupil or face of the user so that it may determine which display region is viewed by the user. The sensor unit 102 may track the user's eyes or face using at least one of a camera, a pupil tracking sensor, and an image sensor. In addition, the sensor unit 102 senses a tilt angle of the portable device so that it may determine which display region is viewed by the user. When the sensor unit 102 senses the tilt angle, it may use at least one of a gravity sensor, a tilt sensor, and a gyro sensor. The sensor unit 102 may transmit specific information indicating which display region is viewed by the user to the controller.

In addition, the sensor unit 102 may detect the user control input. The portable device may detect at least one of touch input, voice input, remote-controller input, and gesture input as the control input. The sensor unit may detect the user control input using at least one of a touch sensitive display unit, a gyro sensor, a remote-controller receiver, a microphone, an action sensor, a proximity sensor, and an illumination sensor. The sensor unit may transmit the detected user control input to the controller.

The controller 103 may control the display unit using information received from the sensor unit. The controller 103 may receive specific information indicating which region of the display unit is viewed by the user from the sensor unit, and may also receive information regarding the control input from the sensor unit. If the user gazes at the first display region and the control input is detected from the first display region, the controller 103 may control the content displayed on the first display region in response to the control input. In addition, if the user gazes at the second display region and the control input is detected from the first display region, the controller 103 may control the content displayed on the second display region in response to the control input. As a result, the controller may apply the control input detected from the first display region to the first display region or the second display region in response to the user's eyes.

FIG. 6 is a block diagram illustrating a portable device according to an embodiment. Individual blocks shown in FIG. 6 are configured to logically identify respective elements of the portable device. FIG. 6 is a block diagram illustrating the portable device including several elements that are logically distinguished from each other. Therefore, elements of the above-mentioned portable device may be fabricated as one or more chips according to portable device design.

Figure 7:
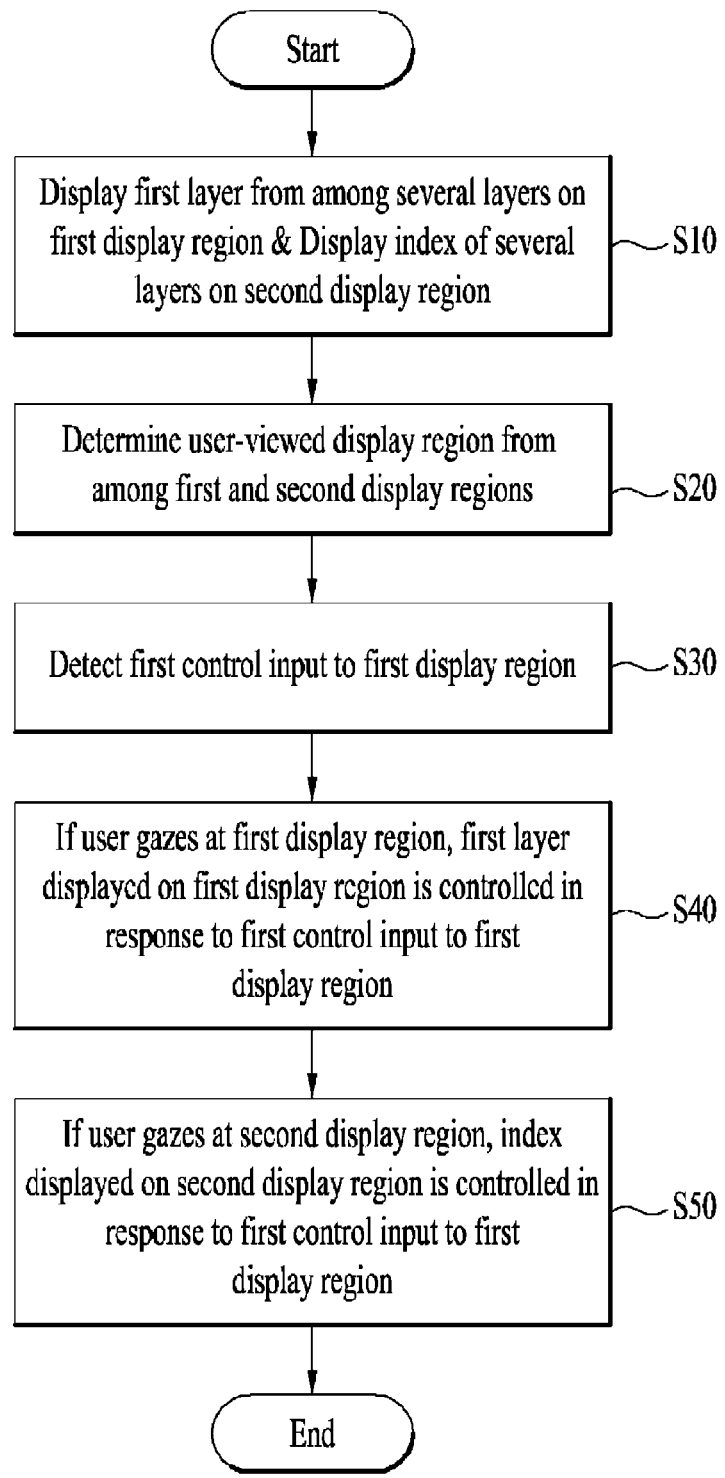
FIG. 7 is a flowchart illustrating a method for controlling a portable device according to an embodiment.

FIG. 7 is a flowchart illustrating a method for controlling the portable device according to an embodiment. Referring to FIG. 7, the portable device may display a first layer from among a plurality of layers on a first display region mounted to the front surface of the portable device in step S10. As shown in FIG. 1, the portable device may simultaneously execute a plurality of applications. An execution screen image corresponding to one application from among a plurality of currently running applications may be displayed as a first layer on the first display region by the portable device. The portable device may execute a plurality of layers corresponding to other non-displayed applications as a background program.

The portable device may display an index of a plurality of layers on the second display region located at a lateral surface of the portable device in step S10. As shown in FIG. 1, the portable device may display an index of the plurality of layers on the second display region. The portable device may match respective entries contained in the index to respective layers. That is, if the portable device executes a first layer and a second layer, the portable device may match the first layer to a first entry contained in the index and match a second layer to a second entry contained in the index. The portable device may separately display an index including entries corresponding to a currently running application or layer on the second display region, so that it may provide information regarding the currently running application or layer.

The portable device may sense a display region viewed by the user from among the first display region and the second display region in step S20. The portable device may sense which one of the first display region and the second display region is viewed by the user using the sensor unit. As shown in FIGS. 3 and 6, the portable device may detect the user's eyes or sense a tilt angle of the portable device, such that it may sense which one of the first display region and the second display region is viewed by the user. The portable device may control the content displayed on each display region on the basis of specific information regarding a user-viewed display region.

The portable device may detect a first control input regarding the first display region in step S30. The portable device may detect at least one of touch input, voice input, remote-controller input, and gesture input as a first control input. The portable device may detect the first control input using a touch sensor, a microphone, a signal receiver, and an action sensor.

If the user gazes at the first display region, the portable device may control the first layer displayed on the first display region in response to the first control input in step S40. As shown in FIG. 2, the portable device may scroll content contained in the first layer displayed on the first display region viewed by the user, or may turn over a page of the content. Therefore, the portable device may also display other content contained in the first entry corresponding to the first layer. The portable device may control the first display region in response to the first control input while the user gazes at the first display region.

If the user gazes at the second display region, the portable device may control the index displayed on the second display region in response to the first control input of the first display region in step S50. As shown in FIG. 3, the portable device may control the index displayed on the second display region viewed by the user. The index may include a plurality of entries corresponding to a plurality of layers. As shown in FIGS. 4 and 5, the portable device may arrange the folder or display the scroll wheel interface when displaying the index. In addition, the portable device may select among the plurality of entries when controlling the index. The portable device may select one among a plurality of folders in response to the first control input. In addition, the portable device may rotate the scroll wheel interface in response to the first control input, such that it may select one among the plurality of entries. The portable device may display a layer corresponding to the selected folder or entry on the first display region.

As described above, the portable device may adaptively change the control target in response to the user's eyes. That is, the portable device may control the user-viewed display region instead of controlling the display region through detection of user input. Therefore, although the control input is detected from the same display region, the portable device may control the content displayed on different display regions in response to the user-viewed display region.

Figure 8:
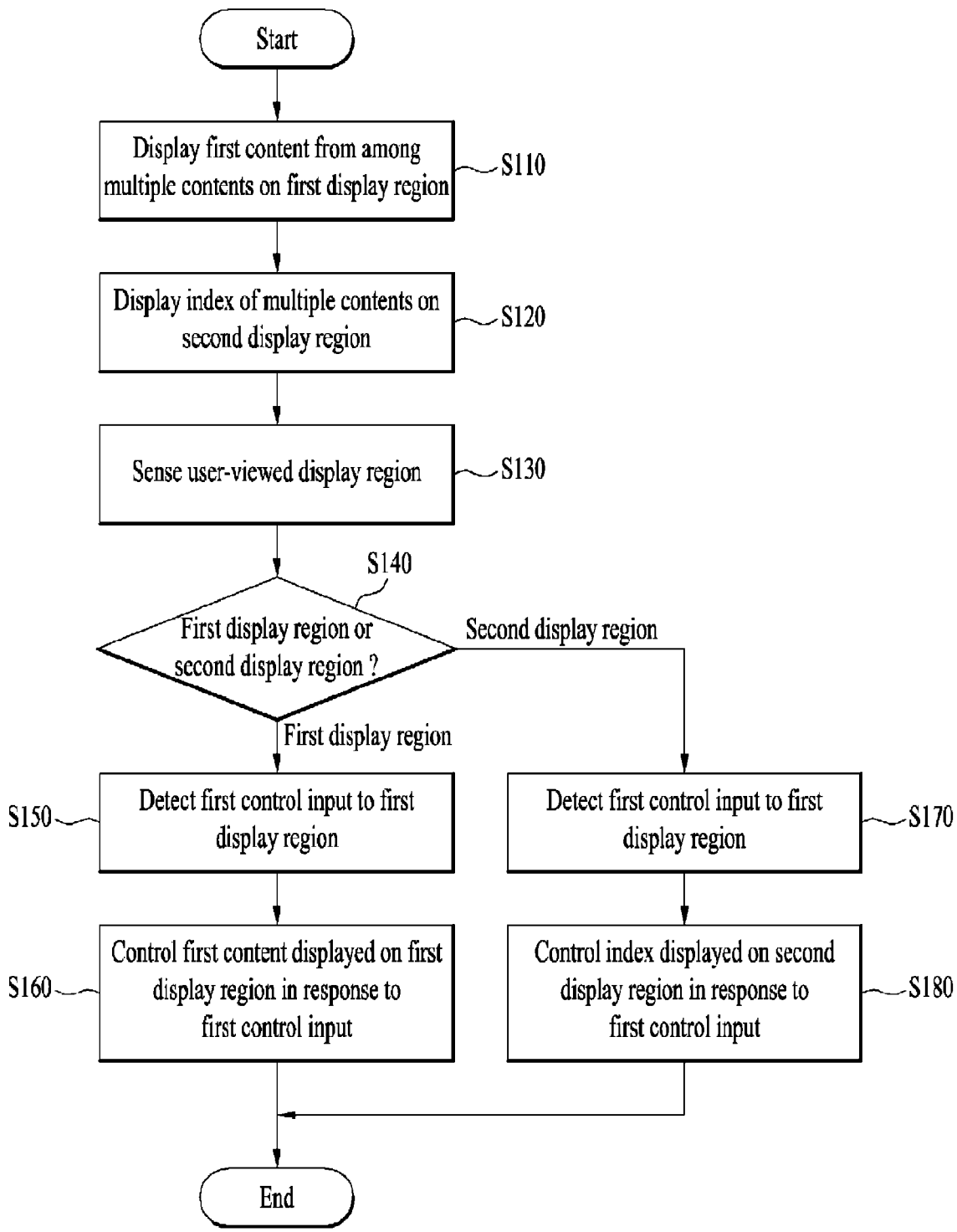
FIG. 8 is a flowchart illustrating a method for controlling a portable device according to another embodiment.

FIG. 8 is a flowchart illustrating a method for controlling the portable device according to another embodiment. Referring to FIG. 8, the portable device may display first content from among a plurality of content on the first display region in step S110. The portable device may control the first content on the first display region as shown in FIG. 1. In this case, the first content may be referred to as a first layer. The portable device may display the first content selected by either the portable device or the user from among a plurality of content. The content may include a web browser, an application execution screen image, multimedia content, and a photo or document. The user may visually confirm the content displayed on the first display region.

The portable device may display an index of a plurality of content on the second display region in step S120. As shown in FIG. 1, the portable device may include an index including a title, a summary, or a tag of a plurality of content on the second display region. The index may include a title, a summary, or a tag of the plurality of content as the entry.

That is, the portable device may include an entry corresponding to each of the plurality of content in the index, and may display the index.

The portable device may sense a user-viewed display region in step S130, and may determine whether the user-viewed display region is a first display region or a second display region in step S140. The portable device may sense and determine which display region is viewed by the user. As shown in FIGS. 2 and 3, the portable device may sense which one of the first display region and the second display region is viewed by the user. The portable device may sense the user-viewed display region using at least one of a tilt sensor, a pupil tracking sensor, a face detection sensor, a gravity sensor, a gyro sensor, a proximity sensor, and an illumination sensor. The portable device may determine whether the user-viewed display region is a first display region or the second display region on the basis of the sensed result. In accordance with the embodiment, the portable device may sense and decide the user-viewed display region after the first control input of the user has been detected.

If the user gazes at the first region, the portable device may detect the first control input to the first display region in step S150. The portable device may detect at least one of touch input, voice input, remote-controller input, and gesture input as the first control input. The portable device may detect the first control input using a touch sensor, a microphone, a signal receiver, and an action sensor.

The portable device may control the first content displayed on the first display region in response to the first control input in step S160. The portable device may control the first content in response to attributes of the first control input. Attributes of the first control input may include category, direction, and speed of the first control input. The portable device may scroll or move the first content when controlling the first content. In addition, the operation for controlling the first content by the portable device may include extension, reduction, movement, copying, and cutting of the first content.

If the user gazes at the second region, the portable device may detect the first control input to the first display region in step S170. The portable device may detect at least one of touch input, voice input, remote-controller input, and gesture input as the first control input. The portable device may detect the first control input using a touch sensor, a microphone, a signal receiver, and an action sensor.

The portable device may control the index displayed on the second display region in response to the first control input in step S180. The portable device may control the second display region using the first control input to the first display region. The portable device may control the index displayed on the second display region. When the portable device controls the index, it may select at least one entry from among a plurality of entries contained in the index.

When the entry is selected, the portable device may display the content corresponding to the corresponding entry on the first display region. If the content displayed on the first display region is different from the content corresponding to the selected entry, the portable device may display the content corresponding to the selected entry on the first display region. Therefore, the user may control the index displayed on the second display region using the first control input to the first display region. As a result, the portable device may change the content displayed on the first display region on the basis of the user's index control.

As described above, the portable device according to the embodiment may adaptively change a control target in response to a user-viewed display region upon receiving the same control input.

As is apparent from the above description, the portable device according to the embodiment may display an index of the currently running applications in the background.

The portable device according to the embodiment may include a main display region and an index display region.

The portable device according to the embodiment may display an index corresponding to the application on an index display region.

The portable device according to the embodiment may sense a display region viewed by the user.

The portable device according to the embodiment may operate in different ways according to user-viewed displayed regions regarding the same control input.

The portable device according to the embodiment may control one among the plurality of display regions in response to the user's eyes.

It will be apparent to those skilled in the art that various modifications and variations can be made in the present specification without departing from the spirit or scope of the specification. Thus, it is intended that the present specification covers the modifications and variations of this specification provided they come within the scope of the appended claims and their equivalents.

What is claimed is:

1. A portable device, comprising:
    a display unit including a front display region and a lateral display region displaying a plurality of indexes which indicates a plurality of simultaneously running applications;
    a sensor unit; and
    a controller configured to:
        display a first execution screen corresponding to a first application from among the plurality of applications on the front display region in a state of being a selected index corresponding to the first application from among the plurality of indexes,
        detect a scroll input to the front display region and a user gaze direction to the front display region or the lateral display region,
        determine a user-viewed display region from among the front display region and the lateral display region according to the user gaze direction,
        scroll the first execution screen displayed on the front display region in response to the scroll input to the front display region when the front display region is the user-viewed display region,
        scroll the plurality of indexes displayed on the lateral display region, select an index corresponding to a second application from among the plurality of applications and display a second execution screen corresponding to the second application on the front display region as a foreground application in response to the scroll input when the lateral display region is the user-viewed display region,
    wherein the first application is running as a background application.

2. The portable device according to claim 1, wherein the front display region is adjacent to the lateral display region, and the lateral display region has a curved surface.

3. The portable device according to claim 1, wherein:
    the controller further displays a scroll wheel interface on the lateral display region and displays the plurality of indexes on the scroll wheel interface, and then rotates the scroll wheel interface in response to the scroll input.

4. The portable device according to claim 3, wherein:
after the scroll wheel interface stops rotation, the controller displays a third execution screen corresponding to a third application from among the plurality of applications selected by the scroll wheel interface on the front display region.

5. The portable device according to claim 1, wherein:
the controller scrolls the first execution screen by a second distance in response to a first distance generated by movement of the scroll input when controlling the first execution screen in response to the scroll input, and
the controller scrolls the plurality of indexes by a third distance in response to the first distance generated by movement of the scroll input when controlling the plurality of indexes in response to the scroll input.

6. The portable device according to claim 5, wherein the second distance is identical or longer than the third distance.

7. The portable device according to claim 1, wherein the plurality of applications corresponds to a plurality of tabs contained in a single web browser, and the plurality of indexes includes the plurality of tabs as entries.

8. The portable device according to claim 1, wherein the plurality of indexes includes a plurality of folder icons each including a file as an entry, and the plurality of applications respectively corresponds to the plurality of folder icons.

9. The portable device according to claim 1, wherein:
when the controller controls the first execution screen displayed on the front display region in response to the scroll input, the controller controls a content contained in the first execution screen in response to attribute of the scroll input.

10. The portable device according to claim 9, wherein the attribute of the scroll input includes at least one of category, direction, and speed of the scroll input.

11. The portable device according to claim 1, wherein the sensor unit senses which display region is the user-viewed display region using at least one of a user's grip, a direction of gravity, a user's face, the user gaze direction, and a variation of illumination.

12. The portable device according to claim 1, wherein the sensor unit measures a tilt angle of the portable device on basis of gravity direction so as to determine which display region is the user-viewed display region.

13. The portable device according to claim 12, wherein the sensor unit measures the tilt angle using at least one of a tilt sensor, a gyro sensor, and a gravity sensor.

14. The portable device according to claim 1, wherein the front display region and the lateral display region are distinguished from each other by an edge of the portable device.

15. The portable device according to claim 14, wherein an internal angle $\alpha$ between the front display region and the lateral display region is $90° \leq \alpha < 180°$.

16. A method for controlling a portable device, comprising:
displaying a plurality of indexes which indicates a plurality of simultaneously running applications on a lateral display region;
displaying a first execution screen corresponding to a first application from among the plurality of applications on a front display region in a state of being a selected index corresponding to the first application from among the plurality of indexes;
detecting a scroll input to the front display region and a user gaze direction to the front display region or the lateral display region;
determining a user-viewed display region from among the front display region and the lateral display region according to the user gaze direction;
scrolling the first execution screen displayed on the front display region in response to the scroll input to the front display region when the front display region is the user-viewed display region; and
scrolling the plurality of indexes displayed on the lateral display region, selecting an index corresponding to a second application from among the plurality of applications and displaying a second execution screen corresponding to the second application on the front display region as a foreground application in response to the scroll input when the lateral display region is the user-viewed display region,
wherein the first application is running as a background application.

* * * * *